United States Patent
Sasaki et al.

(10) Patent No.: US 6,823,109 B2
(45) Date of Patent: Nov. 23, 2004

(54) OPTICAL FIBER-LENS ARRAY

(75) Inventors: Yasuji Sasaki, Osaka (JP); Yoshiro Sato, Osaka (JP); Zhu Xiaofan, Osaka (JP)

(73) Assignee: Nippon Sheet Glass, Co., Ltd., Osaka (JP)

( * ) Notice: Subject to any disclaimer, the term of this patent is extended or adjusted under 35 U.S.C. 154(b) by 0 days.

(21) Appl. No.: 09/794,337

(22) Filed: Feb. 28, 2001

(65) Prior Publication Data

US 2002/0031301 A1 Mar. 14, 2002

(30) Foreign Application Priority Data

Mar. 1, 2000 (JP) ..................... P2000-055768

(51) Int. Cl.[7] .............................. G02B 6/32
(52) U.S. Cl. .................. 385/34; 385/31; 385/89; 385/93
(58) Field of Search ............... 385/34, 31, 88, 385/89, 93, 91, 52, 137

(56) References Cited

U.S. PATENT DOCUMENTS

| 5,371,820 A | * 12/1994 | Welbourn et al. ............ 385/76 |
| 5,446,810 A | * 8/1995 | Watanabe et al. ............ 385/22 |
| 5,588,081 A | * 12/1996 | Takahashi .................... 385/93 |
| 5,606,635 A | 2/1997 | Haake |
| 6,704,147 B2 | 3/2004 | Fukuzawa et al. |

FOREIGN PATENT DOCUMENTS

| EP | 0 564 207 | 10/1993 |
| EP | 0 712 015 | 5/1996 |
| GB | 2 012 982 | 8/1979 |
| GB | 2 097 550 | 11/1982 |

OTHER PUBLICATIONS

European Patent Office Search Report Mailed Nov. 2, 2001.

\* cited by examiner

*Primary Examiner*—Akm Enayet Ullah
*Assistant Examiner*—Sung Pak
(74) *Attorney, Agent, or Firm*—Whitham, Curtis & Christofferson, P.C.

(57) ABSTRACT

In an optical fiber-lens array, the optical axes of the gradient index rod lens and of the optical fiber are aligned easily with high accuracy. The optical fiber-lens array includes a first substrate having a gradient index rod lens accommodated in V-shaped grooves for rod lenses formed in parallel at prescribed pitches, and a second substrate having optical fibers accommodated in V-shaped grooves for optical fibers formed at the same array pitches with said V-shaped grooves for rod lenses. The first substrate and the second substrate are connected by guide pins placed on the common positioning guide grooves formed on the first substrate and the second substrate with the respective end surfaces of the gradient index rod lenses and the respective end surfaces of the corresponding optical fibers faced toward each other.

19 Claims, 5 Drawing Sheets

OPTICAL FIBER-LENS ARRAY

BACKGROUND OF THE INVENTION

The present invention relates to an optical fiber-lens array, and more specifically to a connecting structure between a gradient index rod lens and an optical fiber.

Hitherto, optical information transmission has been performed by the steps of converging outgoing light from one of optical fibers by means of a lens to make collimated lights, propagating the collimated lights, converging said collimated lights by means of another lens and launching them into the other optical fiber, or by the steps of converging outgoing light from the optical fiber by means of a lens and then optically combining them into an optical component. Such an optical system may construct a variety of optical modules by placing a light element such as a laser diode or photodiode on the side of light convergence, or by interposing various optical components such as a filter, an optical isolator, an optical switch, or an optical modulator between both lenses.

Though the lens used here is a convex lens, an optical fiber-lens array may be constructed using a gradient index rod lens. The rod lens of gradient index type has a characteristic in which the refraction index changes gradually in the direction of the radius from the axis thereof, so that incoming light may be converted into collimated lights or converged and launched by defining the length of the lens or the distance between the lens and the optical fiber according to the wavelength. In the optical fiber-lens array employing a gradient index rod lens as described above, it is required to coincide the optical axis of the gradient index rod lens with the optical axis of the optical fiber with high accuracy to reduce the coupling loss and thus the connecting structure as described below has been employed.

In other words, as shown in FIG. 9, such a connecting structure is employed that the gradient index rod lens 1 is fitted into the sleeve 2 through one of the ends thereof and an optical fiber 3 fitted with a capillary tube 4 thereon is fitted into the sleeve 2 from the other end thereof and the end surface of the gradient index rod lens 1 is abutted to the end surface of the optical fiber 3 so that their optical axes L coincide. This connecting structure is called a single core collimator, which is used by being accommodated in a V-shaped groove 6 formed on the substrate 5 when building an optical module together with other optical components.

As shown in FIG. 10, another connecting structure is employed, in which a V-shaped groove for rod lens 6a for accommodating a gradient index rod lens 1 is formed from one of the ends of the substrate 5 (left end in the figure) to the center thereof, and a V-shaped groove for optical fiber 6b is formed from the other end to the end of the V-shaped groove for rod lens 6a, and a gradient index rod lens 1 and an optical fiber 3 are accommodated in the corresponding V-shaped grooves 6a and 6b respectively. The widths of the opening and the tilt angles of the V-shaped groove 6a for rod lens and the V-shaped groove 6b for optical fiber are, as shown in the cross sectional view taken along the line B—B of the same figure, determined respectively so that both of the optical axes L coincide with the gradient index rod lens 1 and the optical fiber 3 accommodated.

However, the connecting structure as shown in FIG. 9 requires troublesome and complex operations such as fitting the gradient index rod lens 1 into the sleeve 2, fitting a capillary tube 4 on the optical fiber 3 and then fitting it into the sleeve 2 another time, to produce a single-core collimator. In addition, it requires accessories such as a sleeve 2 and a capillary tube 4, and there may be cases in which the optical axes L do not coincide depending on the accuracy of the capillary tube 4 or the state of assembly of the optical fiber 3 and the capillary tube 4, whereby adjustment of the optical axes L is inevitable. Moreover, since an optical fiber-lens array comprising a plurality of gradient index rod lenses 1 and optical fibers 3 are used in many cases, a plurality of assemblies, each having an optical fiber and a lens of a single common axis as shown in FIGS. 9 and 10, and a new substrate must be prepared, and even another assembling operation are required additionally to accommodate such circumstances.

In the connecting structure as shown in FIG. 10, two V-shaped grooves 6a, 6b, being different in width or depth of the opening, or even in tilt angle, have to be formed on the same substrate with high accuracy. However, in the collimators of this type, since it is common to use silicon as a material for the substrate and that the V-shaped groove is formed by etching by means of lithography technique, it is difficult to form at once with the two grooves of different shape abutted against with respect to each other, and thus the process accuracy is difficult to realize. In the case of the collimator, since the displacement of the optical axes between the gradient index rod lens 1 and the optical fiber 3 must be at most about 2 μm in order to suppress the amount of attenuation to generally 1 dB or less, the respective V-shaped grooves 6a, 6b is required to be processed with a significantly high degree of accuracy even on individual basis, and thus still higher degree of accuracy is required to process the two V-shaped grooves 6a and 6b into a precisely abutted configuration.

SUMMARY OF THE INVENTION

With such a circumstances in view, it is an object of the present invention to provide a connecting structure in which the alignment of the optical axes between the gradient index rod lens and an optical fiber can be realized with high accuracy and easily in the optical fiber-lens array.

In order to achieve the object described above, the present invention provides an optical fiber-lens array comprising a first substrate having a gradient index rod lens accommodated in V-shaped grooves for rod lenses formed in parallel at prescribed pitches, and a second substrate having optical fibers accommodated in V-shaped grooves for optical fibers formed at the same array pitches as the V-shaped grooves for rod lenses. In the array, the first substrate and the second substrate are connected by guide pins placed on the common positioning guide grooves formed on the first substrate and the second substrate with the respective end surfaces of the gradient index rod lenses and the respective end surfaces of the corresponding optical fibers faced toward each other.

In order to achieve the same object, the present invention provides an optical fiber-lens array comprising a first substrate including gradient index rod lenses inserted into insertion holes for rod lenses formed therethrough in parallel at prescribed pitches and a second substrate including optical fibers inserted into insertion holes for optical fibers formed therethrough in parallel at the same array pitches as the insertion hole for rod lens. In the array, the first substrate and the second substrate are connected by guide pins so that the positioning holes formed through the first substrate and the second substrate are in communication with respect to each other with the end surfaces of the respective gradient index lenses and the end surfaces of corresponding optical fibers faced toward each other.

The present disclosure relates to the subject matter contained in Japanese patent application No. 2000-55768 (filed on Mar. 1, 2000), which is expressly incorporated herein by reference in its entirety.

DESCRIPTION OF THE PREFERRED EMBODIMENT

Figure 1:
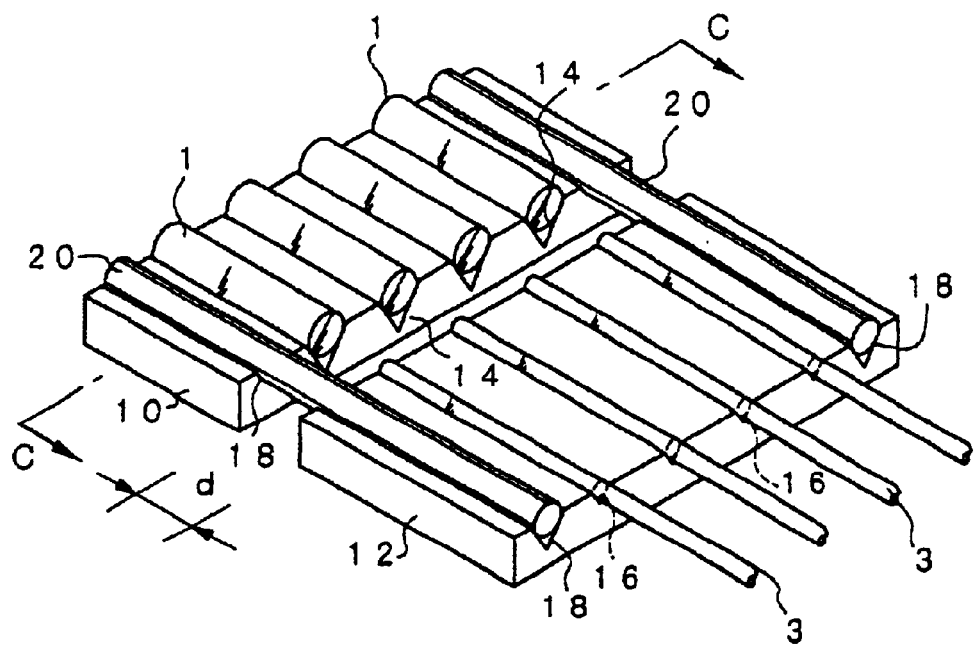
FIG. 1 is a perspective view showing the first embodiment of the present invention.

Referring now to the drawings, an optical fiber-lens array of the present invention will be illustrated in detail.

FIG. 1 is a perspective view showing the first embodiment of the present invention. As shown in the figure, the first substrate 10 is formed with a plurality of V-shaped grooves for rod lenses 14 in parallel at prescribed pitches on the top surface thereon in each of which a gradient index rod lens 1 is accommodated. On the other hand, the second substrate 12 is formed with V-shaped grooves for optical fibers 16 at the same pitches as the V-shaped grooves for rod lens 14 on the first substrate 10 on the top surface thereon, in each of which an optical fiber 3 is accommodated. The term "pitch" herein means the distance between the centers of the opening widths of the adjacent V-shaped grooves, and when the gradient index rod lenses 1 or the optical fibers 3 are accommodated, it means the distance between the center axes (optical axes) of the adjacent gradient index rod lenses 1 or the center axes (optical axes) of the adjacent optical fibers 3.

Figure 2:
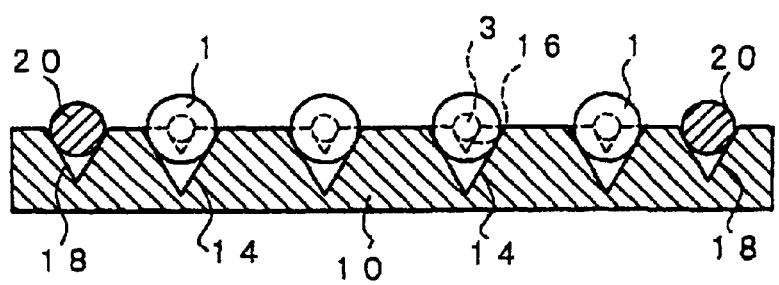
FIG. 2 is a cross sectional view of FIG. 1 taken along the line C—C.
Figure 9:
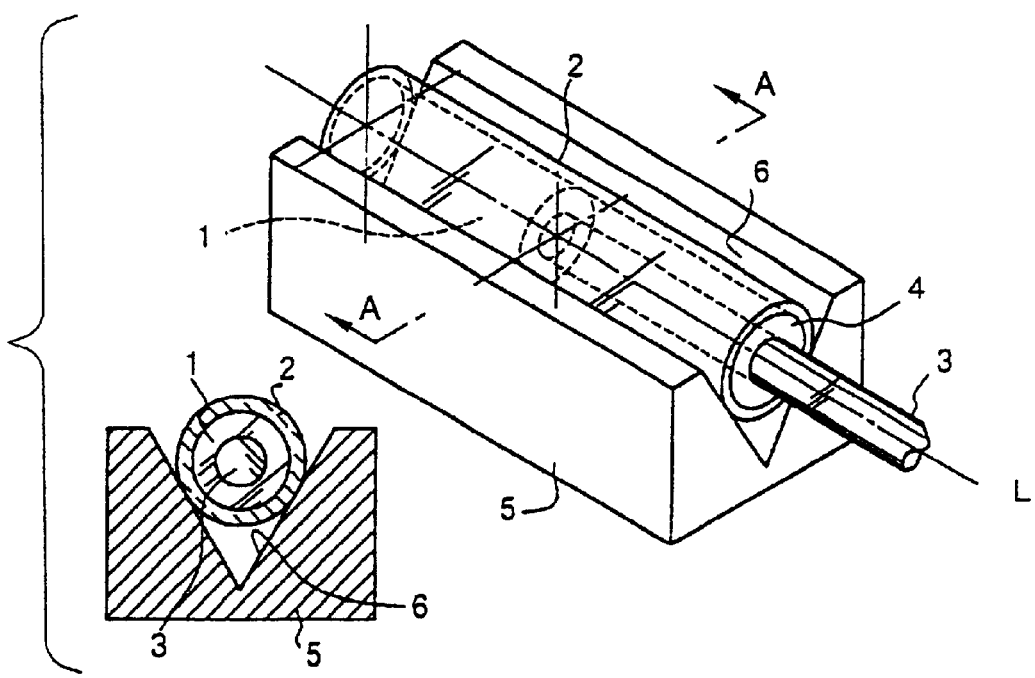
FIG. 9 is a perspective view showing the connecting structure between the gradient index rod lens and the optical fiber in the optical fiber-lens array (single core collimator) in the related art, and a cross sectional view taken along the line A—A.
Figure 10:
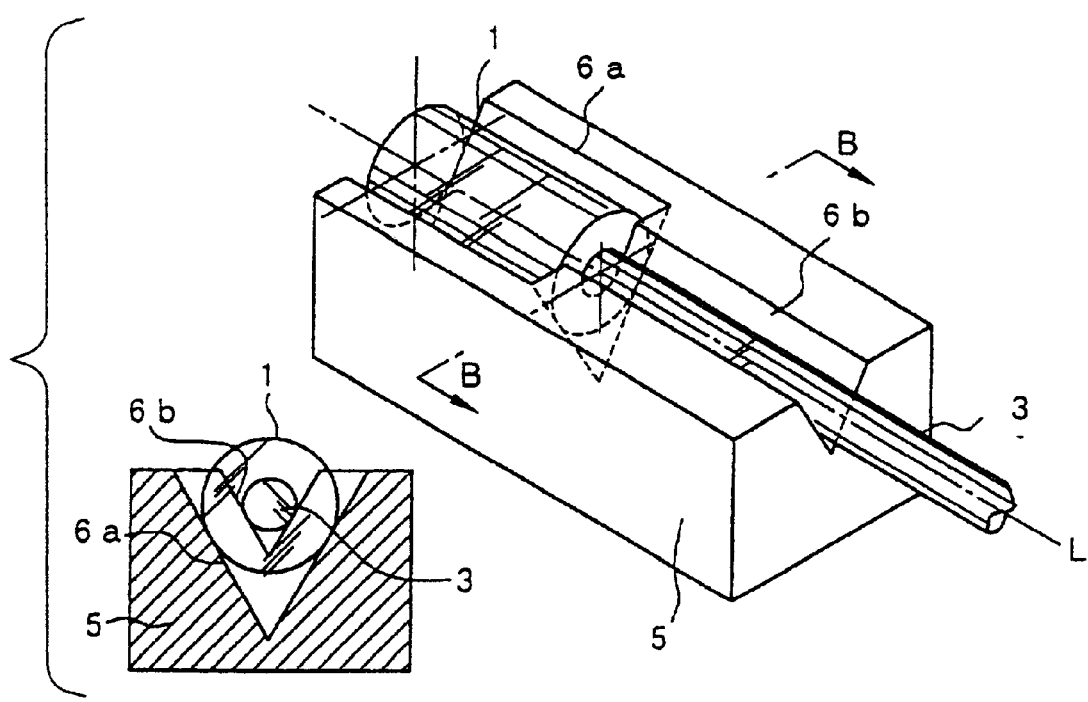
FIG. 10 is a perspective view showing another connecting structure between the gradient index rod lens and the optical fiber in the optical fiber-lens of the related art and a cross sectional view taken along the line B—B.

The width and the tilt angle of the V-shaped groove for rod lens 14 on the first substrate 10 is determined depending on the diameter of the gradient index rod lens 1. For example, as shown in FIG. 2 (a cross sectional view of FIG. 1 taken along the line C—C), it is determined so that the upper half of the gradient index rod lens 1 projects from the upper surface of the substrate when the gradient index rod lens 1 is accommodated therein. Likewise, the V-shaped groove for optical fiber 16 on the second substrate 12 is determined so that the upper half of the optical fiber 1 projects from the upper surface of the substrate when the optical fiber 3 is accommodated. Since the process of forming such grooves is carried out individually for the first substrate 10 and for the second substrate 12, it is higher inaccuracy and easier in operation in comparison with the process of forming two grooves in the abutted configuration as shown in FIG. 9.

On both sides of the V-shaped groove for rod tens 14 on the first substrate 10 and on both sides of the V-shaped groove for optical fiber 16 on the second substrate 12, there are formed positioning guide grooves 18 being common for both of the substrates 10, 12. In other words, while positioning guide grooves 18 are formed on the first substrate 10 at the positions outside of the outermost V-shaped grooves 14 at prescribed distances in parallel with the V-shaped grooves for rod lenses 14, positioning guide grooves 18 having the same cross section as the positioning guide groove formed on the first substrate 10 are formed on the second substrate 12 at the positions corresponding to the positioning guide grooves 18 on the first substrate 10 in parallel with the V-shaped grooves for the optical fibers 16. The configuration of the cross section of the positioning guide groove 18 is not limited to the specific configuration, and thus it may be semi-circular in addition to the V-shaped groove shown in the figure. The configuration of the cross section of the positioning guide groove 18, in other words, the opening width and tilt angle for the V-shaped groove or the radius for the semi-circular groove, are determined so that the upper half of the guide pin 20 is projected when the guide pin 20 described below is accommodated. The positioning guide groove 18 can be formed easily with a higher degree of accuracy, as the V-groove for rod lens 14 and the V-groove for optical fiber 16, in comparison with the process of forming two grooves in the abutted configuration as shown in FIG. 9.

In order to connect the gradient index rod lens 1 and the optical fiber 3 by the use of the above-described first substrate 10 and the second substrate 12, the gradient index rod lens 1 is accommodated in the V-shaped groove for rod lens 14 on the first substrate 10 and the optical fiber 3 is accommodated in the V-shaped groove for optical fiber 16 on the second substrate 12 in the first place, and then the first substrate 10 and the second substrate 12 are disposed facing toward each other with the end surfaces of the gradient index rod lenses 1 and the end surfaces of the optical fibers 3 faced toward each other. At this time, the first substrate 10 and the second substrate 12 maybe disposed at a distance d, or may be disposed with the end surfaces of the gradient index rod lenses 1 and the end surfaces of the optical fibers 3 brought into contact.

Then, the guide pins 20 are spanned across the positioning guide grooves 18 on the first substrate 10 and the positioning guide groves 18 on the second substrate 12. This condition is shown in FIG. 2, in which the gradient index rod lens 1 and the optical fiber 3 are connected so that their optical axes L coincide. The guide pin 20 limits the swinging movement of both of the substrates 10 and 12 in the horizontal direction so that the condition in which the optical axes coincide can be maintained. The whole length of the guide pin 20 does not necessarily require being the length that can occupy both of the positioning guide grooves 18 on the first substrate 10 and the second substrate 12 completely, and it presents no problem practically even when the length of the guide pin 20 is determined so as to occupy both of the positioning guide grooves 18 from their opposing ends to about the midway thereof. The guide pin 20 may also be projected from the end surfaces of the first substrate 10 and the second substrates 12.

Figure 3:
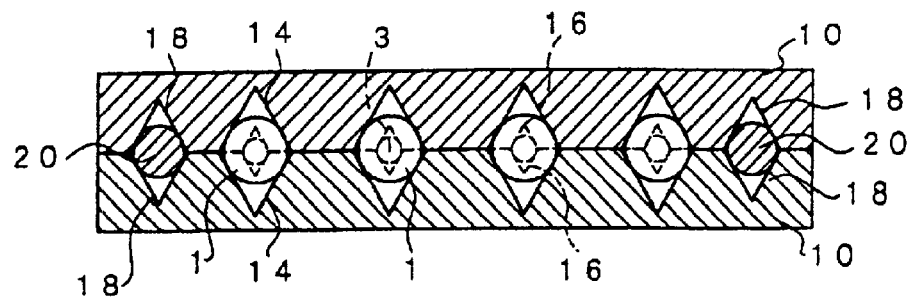
FIG. 3 is a cross sectional view showing an alternative of the first embodiment.

In the state described above, the gradient index rod lenses 1, the optical fibers 3 and the guide pins 20 are fixed by means of fixing means suitable for the first substrate 10 and the second substrate 12, for example, adhesive agent or the like to complete an optical fiber-lens array. In addition, in order to enhance the strength of this fixed state, as shown in FIG. 3, another first substrate 10 and another second substrate 12 is placed thereon to interpose the gradient index rod lenses 1, the optical fibers 3, and the guide pins 20.

Figure 4:
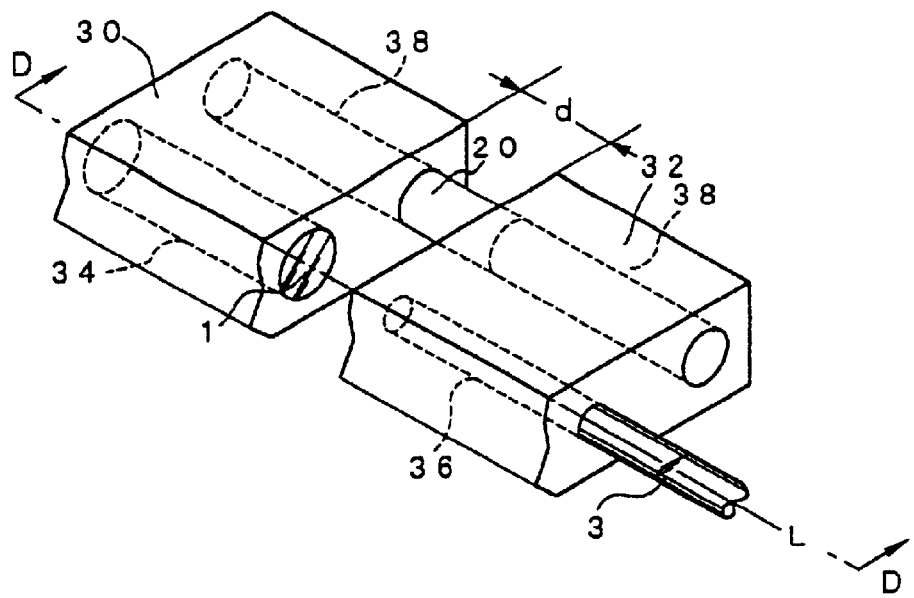
FIG. 4 is a partly perspective view showing the second embodiment of the present invention.
Figure 5:
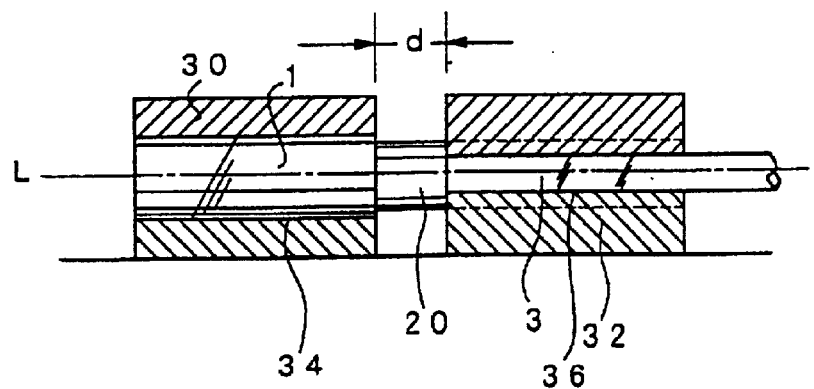
FIG. 5 is a cross sectional view of FIG. 4 taken along the line D—D.

The second embodiment of the present invention is shown in FIG. 4 and FIG. 5. As shown in FIG. 4, the first substrate 30 is formed with insertion holes for rod lenses 34 through which the gradient index rod lens 1 can be inserted along the center of the thickness and in parallel at prescribed pitches, and positioning holes 38 through which the above-described guide pins 20 can be inserted in parallel with the insertion holes for rod lenses 34 at the positions outside the outermost insertion holes for rod lenses 34. On the other hand, the second substrate 32 is formed with insertion holes for optical fibers 36 through which the optical fibers 3 can be inserted along the center of the thickness at the same pitches with the insertion holes for rod lenses 34 on the first substrate 30, and the same positioning holes 38 are formed therethrough corresponding to the positioning holes 38 on the first substrate 1. It is preferable to define the clearance between the insertion hole for rod lens 34 and the gradient index rod lens 1, the clearance between the insertion hole for optical fiber 36 and the optical fiber 3, and the clearance between the positioning hole 38 and the guide pin 20 to all about 0.001 mm for the convenience of alignment of the optical axes.

In order to connect the gradient index rod lens 1 and the optical fiber 3 by the use of the above-described first substrate 30 and the second substrate 32, the gradient index rod lens 1 is inserted into the insertion hole for rod lens 34 of the first substrate 30 and the optical fiber 3 is inserted into the insertion hole for optical fiber 36 of the second substrate 32 in the first place, then the first substrate 30 and the second substrate 32 are disposed facing toward each other with the end surface of the gradient index rod lenses 1 and the end surfaces of the optical fibers 3 faced toward each other. Then, the guide pin 20 is inserted into the positioning hole 38 of the first substrate 30 and the positioning hole 38 of the second substrate so as to be connected with each other. Accordingly, as in the first embodiment, the gradient index rod lens 1 and the optical fiber 3 are connected with their optical axes L aligned and the swinging movement of both of the substrates 30 and 32 in the horizontal direction is limited by the guide pin 20 so that the condition in which the optical axes L coincide can be maintained.

In the above-described first and second embodiments, return light can be reduced to alleviate deterioration of the waveform generated when launched into the semi-conductor laser by applying diagonal polishing on the end surface of the gradient index rod lens 1 and on the end surface of the optical fiber 3.

Figure 6:
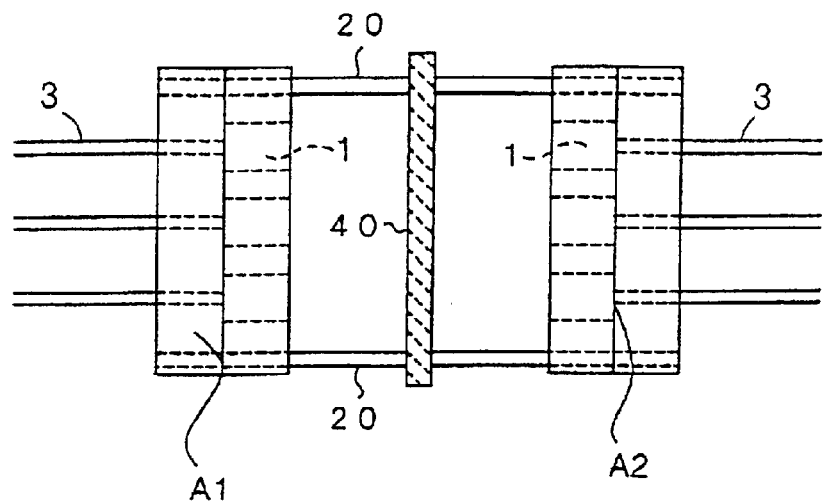
FIG. 6 is a plan view showing an application of the optical fiber-lens array.
Figure 7:
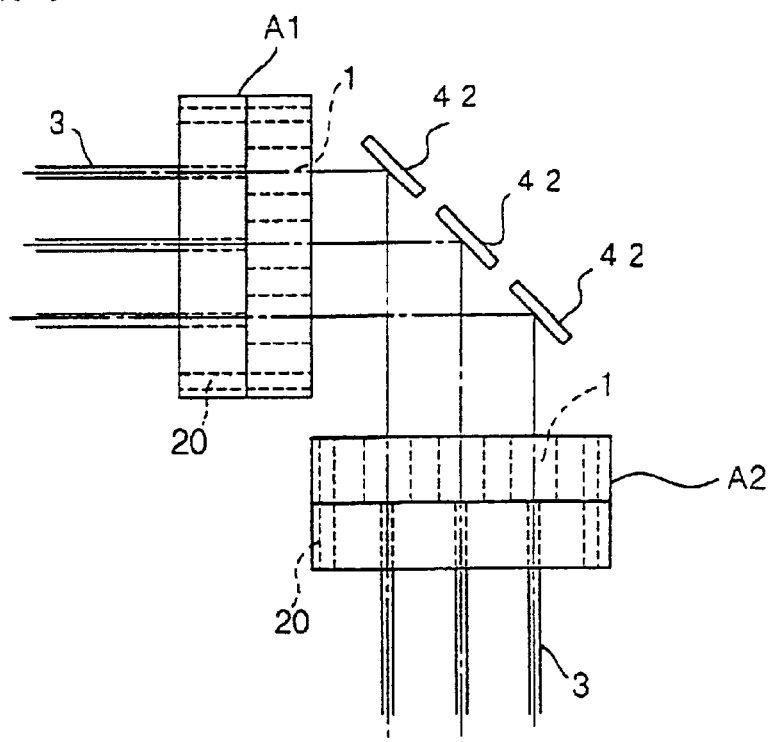
FIG. 7 is a plan view showing another application of the optical fiber-lens array.

The respective optical fiber-lens array thus formed can, as shown in FIG. 6 and FIG. 7, build various optical modules in conjunction with other optical components. In FIG. 6, a pair of optical fiber-lens arrays A1 and A2 is placed at a prescribed distance so that the gradient index rod lenses of both lens arrays are facing toward each other, and an optical filter 40 is inserted to the midpoint between both of the optical fiber-lens arrays A1 and A2 to build a filter array module. In this filter array module, the alignment of the optical axes L of both of the optical fiber-lens arrays A1 and A2 is realized by arranging the above-described guide pins 20 of both optical fiber-lens arrays A1 and A2 so as to be projected from the end surfaces thereof on the side of the gradient index rod lens 1 and aligning the axes of the guide pins 20, 20.

In FIG. 7, an optical switch is constructed by arranging the respective gradient index rod lenses orthogonally so as to face toward the mirror 42 by the use of a pair of optical fiber-lens arrays A1 and A2. In this optical switch, the optical axes of the gradient index rod lenses 1 and the optical fibers 3 of the respective optical fiber-lens arrays A1 and A2 are aligned, and thus more accurate switching action can be realized.

Figure 8:
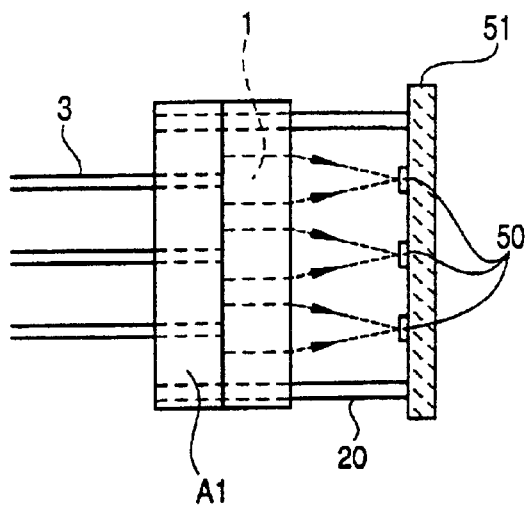
FIG. 8 is a plan view showing still another application of the optical fiber-lens array.

In the example shown in FIG. 6 and FIG. 7, light outgoing from the lens or light incoming into the lens are basically collimated lights and the optical fiber-lens array of the present invention functions as a collimator array. On the other hand, when the outgoing light from the lens is set to be converged by adjusting the length of the lens or the distance between the lens and the optical fiber, as shown in FIG. 8, the optical fiber-lens array A1 of the present invention can be used as a lens array for optical coupling that allows light to enter into the respective light receiving element 51 of the light receiving element array 50. Likewise, the optical fiber-lens array A1 of the present invention can be used to receive light from the light emitting element array such as a semi-conductor laser array or the like and to couple the received light with the optical fiber 3. Moreover, it is also possible to construct the optical system in which the optical fiber-lens array is replaced with the light receiving element array or the semi-conductor laser array in FIG. 7.

As described above, according to the present invention, since the gradient index rod lens and the optical fiber are accommodated on the separate substrates and connected by the guide pins spanning across both substrates, the substrate can be processed with high accuracy and the optical axes of the gradient index rod lens and of the optical fiber can be aligned easily with high accuracy and the condition in which the axes coincide can be maintained. In addition, various optical modules of high performance can be obtained.

What is claimed is:

1. A connecting structure for connecting and aligning a gradient index rod lens having a predetermined length with an optical fiber, the structure comprising:

a first substrate having a first positioning recess adapted to support the gradient index rod lens so that an optical axis of the gradient index rod lens is fixed with respect to the first substrate, and a second positioning recess;

a second substrate having a first positioning recess adapted to support the optical fiber so that an optical axis of the optical fiber is fixed with respect to the second substrate, and a second positioning recess;

a guide pin supported by the second positioning recesses of the first and second substrates to fix the first substrate with respect to the second substrate so that a face of the gradient index rod lens in the first substrate is facing a face of the optical fiber in the second substrate at the junction between the first and second substrates and said optical axes are aligned, wherein incoming light is collimated by defining a distance between the face of the gradient index rod lens and the face of the optical fiber, and wherein either each of the first and second recesses of the first substrate is defined by a through-hole passing through the first substrate, or each of the first and second recesses of the second substrate is defined by a through-hole passing through the second substrate.

2. The structure according to claim 1, wherein each of the first and second recesses of the first substrate is defined by a groove provided to the first substrate.

3. The structure according to claim 1, wherein each of the first and second recesses of the first substrate is defined by a pair of grooves respectively provided to upper and lower halves of the first substrate.

4. The structure according to claim 1, wherein each of the first and second recesses of the first substrate is defined by a through-hole passing through the first substrate.

5. The structure according to claim 1, wherein each of the first and second recesses of the second substrate is defined by a groove provided to the second substrate.

6. The structure according to claim 1, wherein each of the first and second recesses of the second substrate is defined by a pair of grooves respectively provided to upper and lower halves of the second substrate.

7. The structure according to claim 1, wherein each of the first and second recesses of the second substrate is defined by a through-hole passing through the second substrate.

8. The structure according to claim 1, wherein a plurality of the first recesses are provided to the first substrate to respectively support the gradient index lenses.

9. The structure according to claim 1, wherein a plurality of the first recesses are provided to the second substrate to respectively support the optical fibers.

10. The structure according to claim 1, wherein a pair of the second recesses are provided to the first substrate, a pair of the second recesses of the second recesses are provided to the second substrate, and a pair of the guide pins are provided, each said guide pin being supported by a respective mating pair of the second recesses of the first and second substrates.

11. The structure according to claim 1, wherein the second recesses of the first substrate are located opposite from each other with respect to the first recess of the first substrate, and the second recesses of the second substrate are located opposite from each other with respect to the first recess of the second substrate.

12. An optical fiber-lens array comprising:
   a first substrate having gradient index rod lenses, each having a predetermined length, accommodated in rod lens accommodating V-shaped grooves formed in parallel at prescribed array pitches; and
   a second substrate having optical fibers accommodated in optical fiber accommodating V-shaped grooves formed at said prescribed array pitches,
   wherein said first substrate and said second substrate are connected by guide pins disposed in and extending along common positioning guide grooves formed on said first substrate and the second substrate so that end surfaces of the gradient index rod lenses on the first substrate respectively face end surfaces of the optical fibers on the second substrate at the connection between the first and second substrates thereby aligning an optical axis of each respective index rod lens with an optical axis of each respective fiber, wherein incoming light is collimated by defining a length of each respective gradient index rod lens and the end surface of each respective optical fiber, and
   wherein said alignment of axes is measured by a displacement between the gradient index rod lens optical axis and the optical fiber optical axis and said displacement is less than 2 μm.

13. An optical fiber-lens array comprising:
   a first substrate having gradient index rod lenses, each having a predetermined length, inserted into rod lens insertion holes formed therethrough parallel at prescribed array pitches; and
   a second substrate having optical fibers inserted into optical fiber insertion holes formed therethrough in parallel at said prescribed array pitches,
   wherein said first substrate and said second substrate are connected by guide pins inserted into positioning formed through the first substrate and the second substrate so that end surfaces of the gradient index lenses on the first substrate respectively face end surfaces of the optical fibers on the second substrate at the connection between the first and second substrates thereby aligning an optical axis of each respective index rod lens with an optical axis of each respective optical fiber,
   wherein incoming light is collimated by defining a distance between the end surface of each respective gradient index rod lens and the end surface of each respective optical fiber.

14. The structure according to claim 1, wherein the definitions for collimating incoming light are determined according to wavelength.

15. An optical fiber lens array according to claim 12, wherein the definitions for collimating incoming light are determined according to wavelength.

16. An optical fiber lens array according to claim 12, wherein said alignment of axes is measured by a displacement between the gradient index rod lens optical axis and the optical fiber optical axis and said displacement is less than 2 μm.

17. An optical fiber lens array according to claim 13, wherein the definitions for collimating incoming light are determined according to wavelength.

18. An optical fiber lens array according to claim 13, wherein said alignment of axes is measured by a displacement between the gradient index rod lens optical axis and the optical fiber optical axis and said displacement is less than 2 μm.

19. The structure according to claim 1, wherein said alignment of axes is measured by a displacement between the gradient index rod lens optical axis and the optical fiber optical axis and said displacement is less than an amount that limits a coupling loss across said facing to 1 dB or less.

* * * * *